(12) United States Patent
Zhu et al.

(10) Patent No.: US 7,782,531 B2
(45) Date of Patent: Aug. 24, 2010

(54) PORTABLE PROJECTOR SCREEN ASSEMBLY

(75) Inventors: Qiang Zhu, Shenzhen (CN); Xiao-Lin Gan, Shenzhen (CN); Yu-Kuang Ho, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 268 days.

(21) Appl. No.: 11/967,081

(22) Filed: Dec. 29, 2007

(65) Prior Publication Data

US 2009/0109531 A1 Apr. 30, 2009

(30) Foreign Application Priority Data

Oct. 25, 2007 (CN) .................. 2007 1 0202265

(51) Int. Cl.
*G03B 21/56* (2006.01)

(52) U.S. Cl. .................................................. 359/461

(58) Field of Classification Search ................. 359/443, 359/461; 160/26, 29, 32, 133, 263
See application file for complete search history.

(56) References Cited

U.S. PATENT DOCUMENTS

| 1,480,387 | A | * | 1/1924 | Garrett | 160/21 |
| 1,527,408 | A | * | 2/1925 | Hartshorn | 160/263 |
| 3,087,535 | A | * | 4/1963 | Muller | 160/24 |
| 3,228,455 | A | * | 1/1966 | Jacobson | 160/24 |
| 5,868,191 | A | * | 2/1999 | Blackmon, Jr. | 160/31 |
| 6,552,847 | B2 | * | 4/2003 | Congard | 359/445 |

FOREIGN PATENT DOCUMENTS

JP 06250289 A * 9/1994

* cited by examiner

*Primary Examiner*—Christopher E Mahoney
*Assistant Examiner*—Leon Rhodes
(74) *Attorney, Agent, or Firm*—Frank R. Niranjan

(57) ABSTRACT

A portable projector screen assembly includes a roller, two cylinders slidably connected to two ends of the roller respectively, a collapsible member connected to the roller, and a screen. The collapsible member includes a plurality of interconnected pieces. Two free ends of the collapsible member are fixed to free ends of the cylinders respectively. The screen includes a plurality of fixing portions, and the fixing portions are respectively connected to joints of each two pieces of the collapsible member.

9 Claims, 6 Drawing Sheets

PORTABLE PROJECTOR SCREEN ASSEMBLY

BACKGROUND

1. Field of the Invention

The present invention relates to a portable projector screen assembly.

2. Description of Related Art

Typically, a portable projector screen assembly includes a cylinder, and a screen which can be furled along a longitudinal direction and received in the cylinder. However, when the portable projector screen assembly is in use, the size of the screen can only be adjusted in the longitudinal direction, the transverse size of the screen can't be changed. It can't satisfy the needs of different size projectors.

What is needed, therefore, is a portable projector screen assembly with a longitudinally and transversely adjustable size screen.

SUMMARY

An exemplary portable projector screen assembly includes a roller, two cylinders slidably connected to two ends of the roller respectively, a collapsible member connected to the roller, and a screen. The collapsible member includes a plurality of interconnected pieces. Two free ends of the collapsible member are fixed to free ends of the cylinders respectively. The screen includes a plurality of fixing portions, and the fixing portions are respectively connected to joints of each two pieces of the collapsible member.

Other advantages and novel features will become more apparent from the following detailed description of embodiments when taken in conjunction with the accompanying drawings, in which:

DETAILED DESCRIPTION

Figure 1:
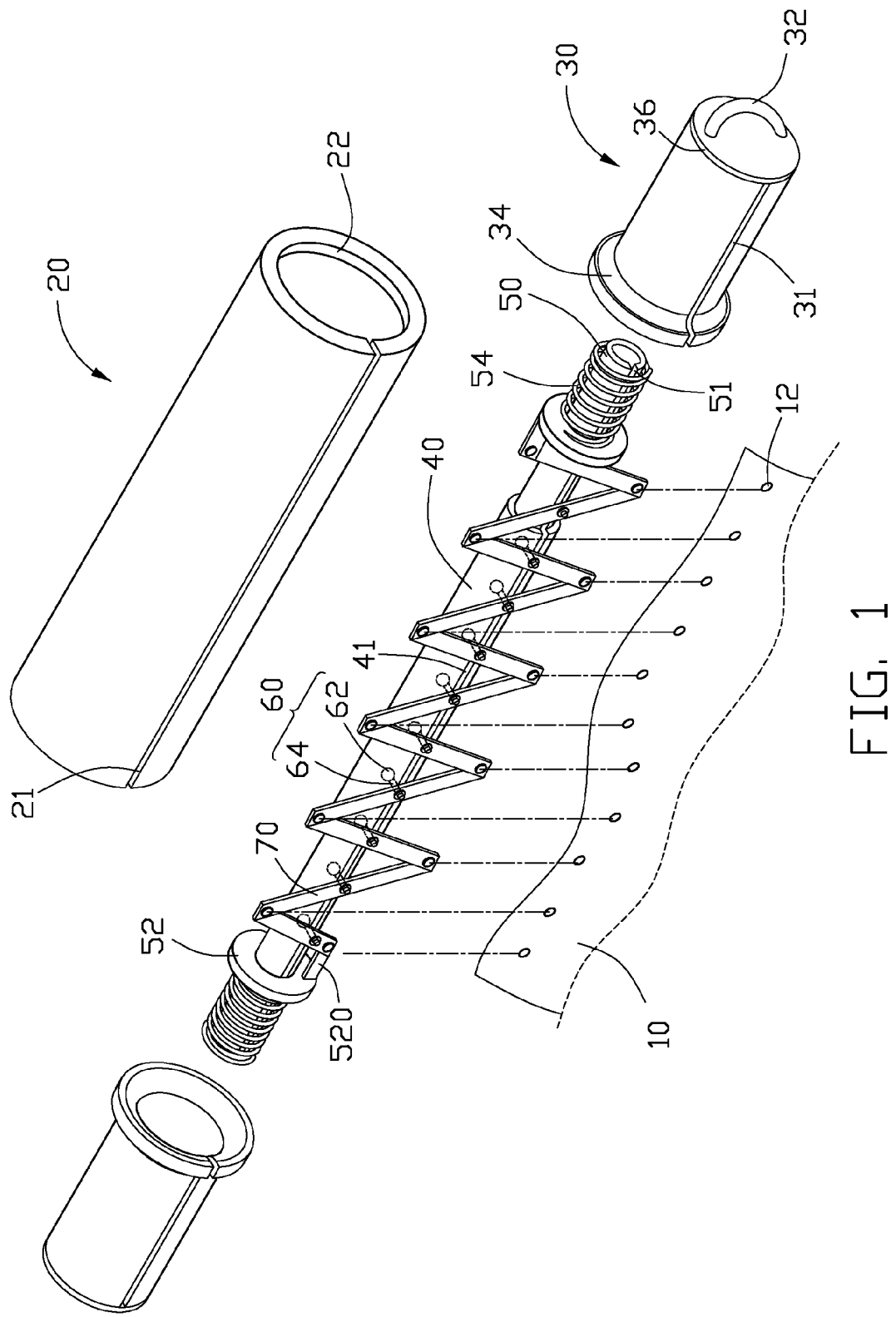
FIG. 1 is an exploded, isometric view of a portable projector screen assembly in accordance with an embodiment of the present invention.
Figure 2:
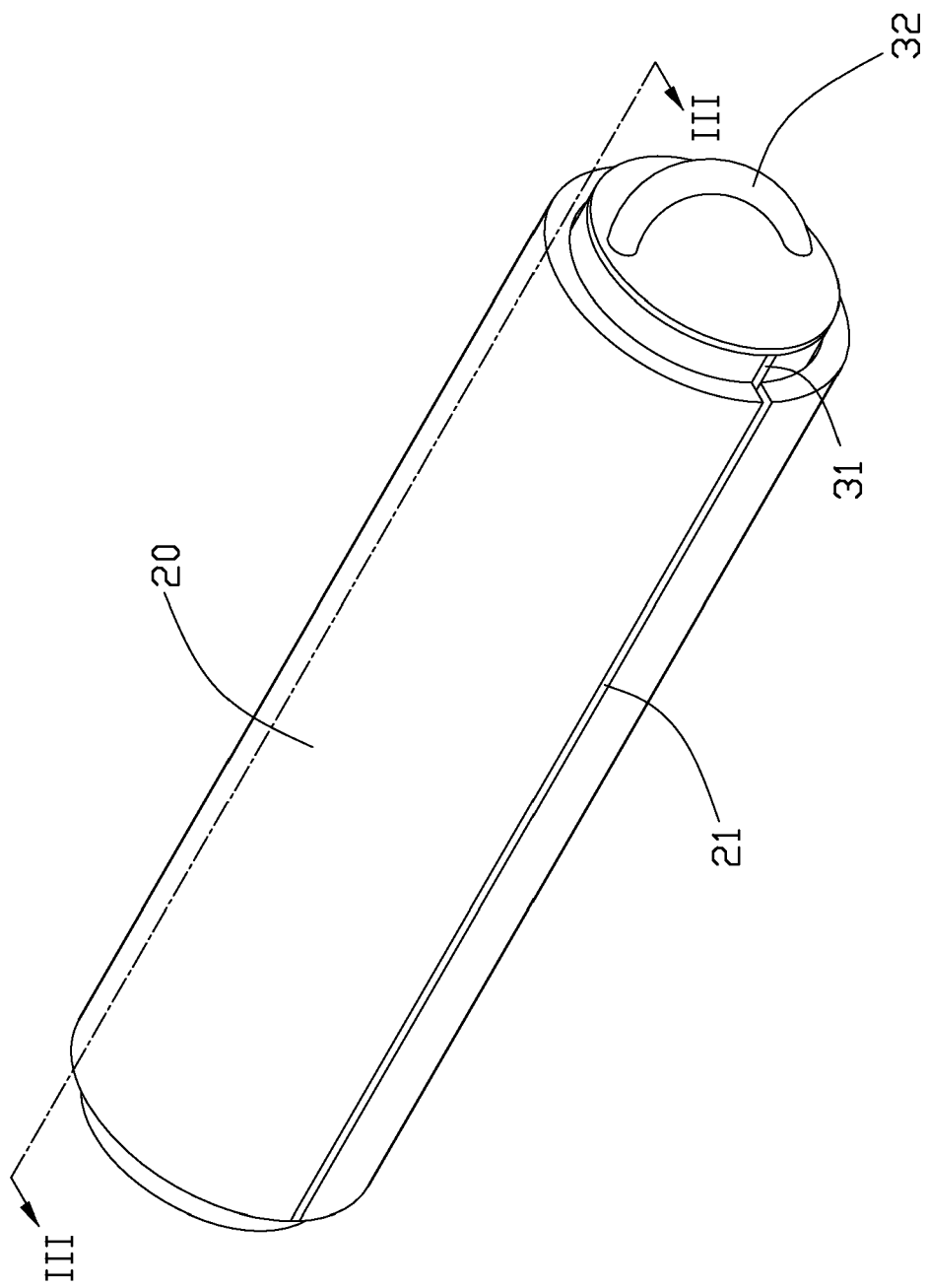
FIG. 2 is an assembled view of FIG. 1, with a screen of the portable projector screen assembly being furled and the portable projector screen assembly collapsed.
Figure 3:
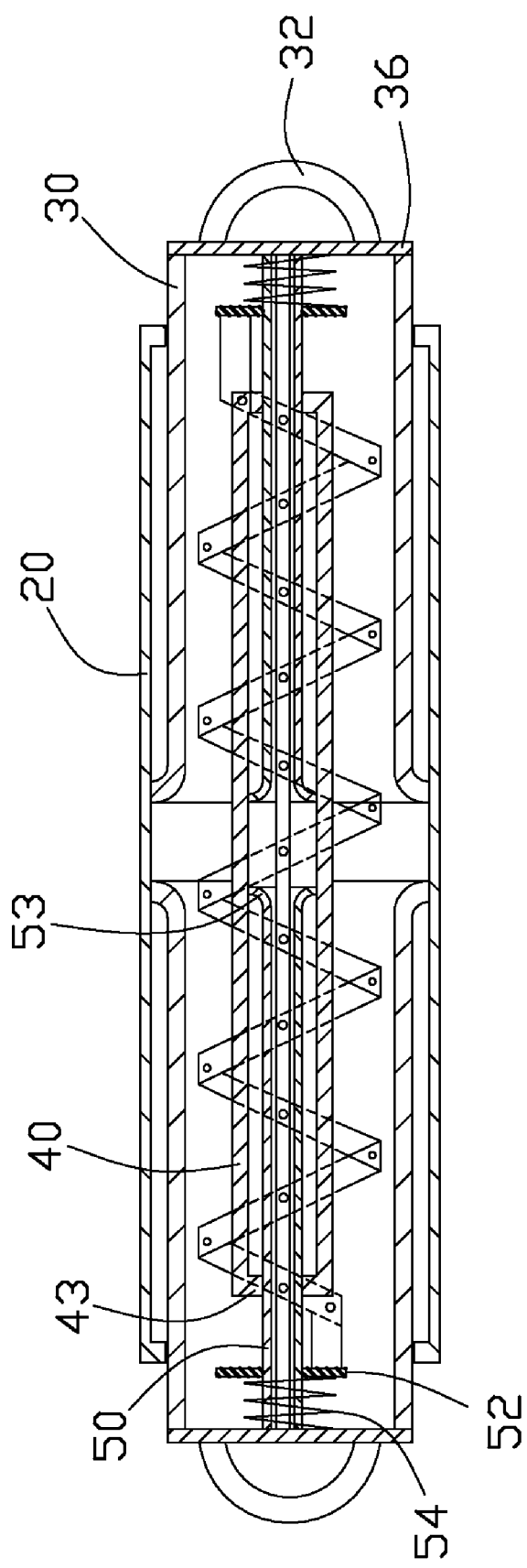
FIG. 3 is a cross-sectional view taken along line III-III of FIG. 2.
Figure 4:
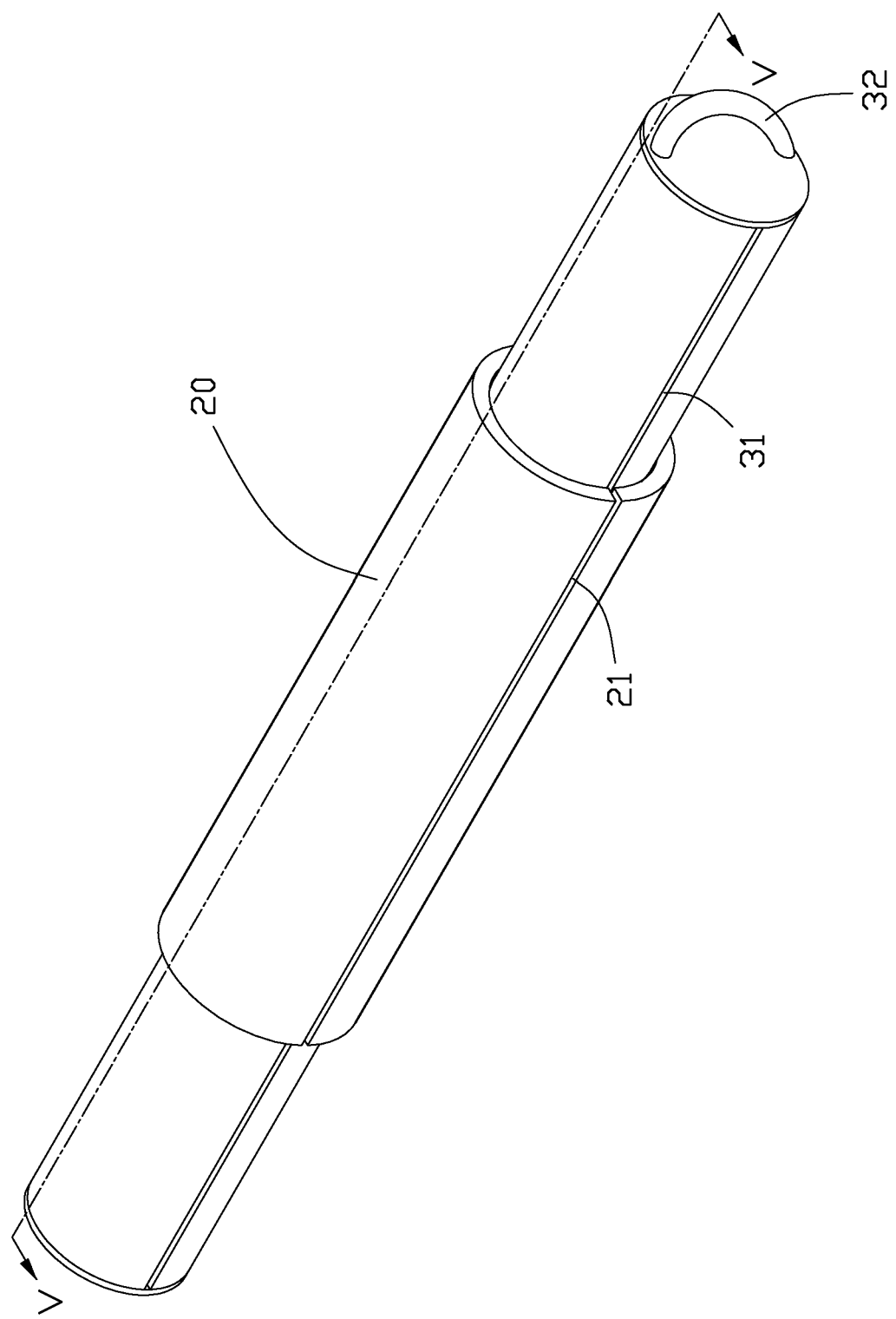
FIG. 4 is an assembled view of FIG. 1, the portable projector screen assembly is extended.

Referring to FIG. 1, a portable projector screen assembly is provided in accordance with a first embodiment of the present invention. The portable projector screen assembly includes a screen 10, a first cylinder 20, two second cylinders 30, and a rolling mechanism received in the first cylinder 20 and the second cylinders 30.

The first cylinder 20 forms two inner flanges 22 on inner surfaces of opposite ends thereof respectively. A slot 21 is defined in the first cylinder 20 and extends a whole length of the first cylinder 20 in a direction parallel with the axis of the first cylinder 20.

Each second cylinder 30 forms an outer flange 34 on an outer surface of one end of the second cylinder 30. A slot 31 is defined in each second cylinder 30 and extends a whole length of the second cylinder 30 in a direction parallel with the axis of the second cylinder 30. A cover 36 having a handle 32 is attached to the opposite end of each second cylinder 30.

Figure 5:
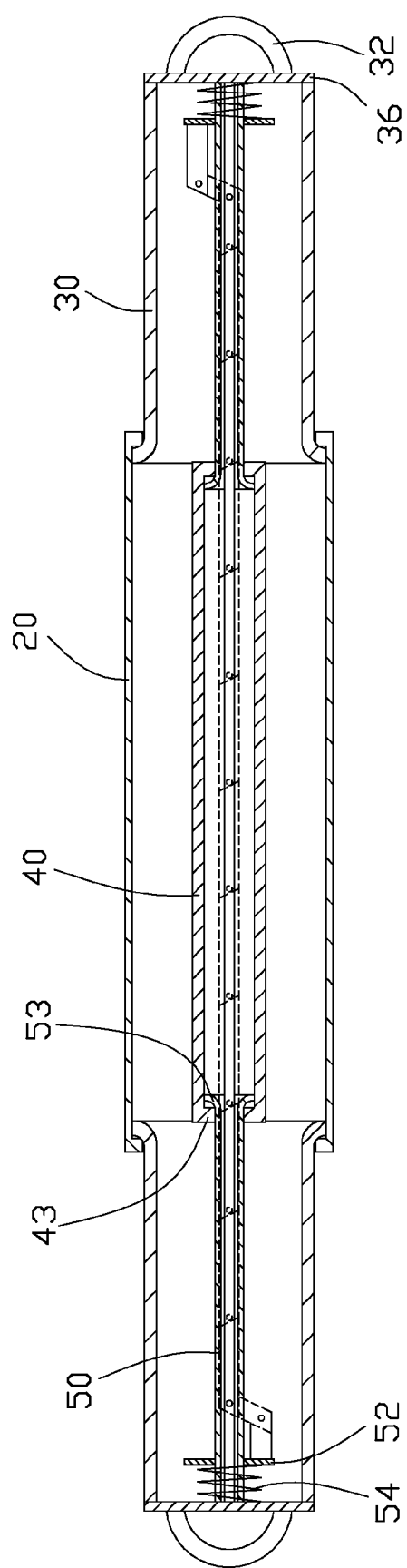
FIG. 5 is a cross-sectional view taken along line V-V of FIG. 4.

Referring to FIGS. 1 and 5, the rolling mechanism includes a roller 40, two third cylinders 50, a collapsible member 70 mounted on the roller 40, two sliding blocks 52 respectively placed around the third cylinders 50, and two elastic members 54. The roller 40 forms two inner flanges 43 (as shown in FIG. 5) on inner surfaces of opposite ends thereof respectively. A slot 41 is defined in the roller 40 and extends a whole length of the roller 40 in a direction parallel with the axis of the roller 40. Each third cylinder 50 forms an outer flange 53 (as shown in FIG. 5) on an outer surface of one end thereof, corresponding to the inner flange 43 of one end of the roller 40. A slot 51 is defined in each third cylinder 50 and extends a whole length of the third cylinder 50 in a direction parallel with the axis of the third cylinder 50.

The third cylinders 50 are compressed to reduce the slots 51 thereof, by being pushed to enter the opposite ends of the roller 40 respectively. Then the third cylinders 50 are released to make the outer flanges 53 engage with the inner flanges 43 of the roller 40 respectively. Thereby, the third cylinders 50 are slidably connected to the roller 40. The third cylinders 50 are rotated to allow the slots 51 thereof to align with the slot 41 of the roller 40. The collapsible member 70 includes a plurality of pivotally interconnected pieces one by one, and two free ends 520. A middle section of each piece is coupled with a connecting member 60. Each connecting member 60 includes a shaft 64 connected with the corresponding piece, and a ball 62 connected with a free end of the shaft 64. The balls 62 of the connecting members 60 are slidably received in the roller 40 and the third cylinders 50 respectively, and the pieces are slidable along the slots 41, 51 together with the connecting members 60. The free ends of the collapsible member 70 are coupled with opposite sides of the sliding blocks 52 on the third cylinders 50 respectively. The elastic members 54 are placed around the third cylinders 50 respectively, with one end of each elastic member 54 being fixed to the other side of the corresponding block 52. In this embodiment, the elastic members 54 are coil springs.

Referring also to FIGS. 2 to 5, in assembly, a plurality of fixing portions 12 of the screen 10 is respectively connected to joints of each two pieces of the collapsible member 70. The rolling mechanism and the screen 10 are inserted to the first cylinder 20 from one of the ends thereof, and the screen 10 is exposed out of the first cylinder 20 from the slot 21 thereof. The second cylinders 30 are compressed to reduce the slots 31 thereof by being pushed into the opposite ends of the first cylinder 20 respectively. Then the second cylinders 30 are released to make the outer flanges 34 engage with the inner flanges 22 of the first cylinder 20 respectively. Thereby, the second cylinders 30 are slidably connected to the first cylinder 20. The slots 31 of the second cylinders 30 align with the slot 21 of the first cylinder 20, two side edges of the screen 10 are inserted into the slots 31, and a bottom edge of the screen 10 is exposed out of the first and second cylinders 20, 30 from the slots 21, 31 thereof. Free ends of the elastic members 54 and the third cylinders 50 are fixed to inner sides of the covers 36 of the second cylinders 30 respectively.

Figure 6:
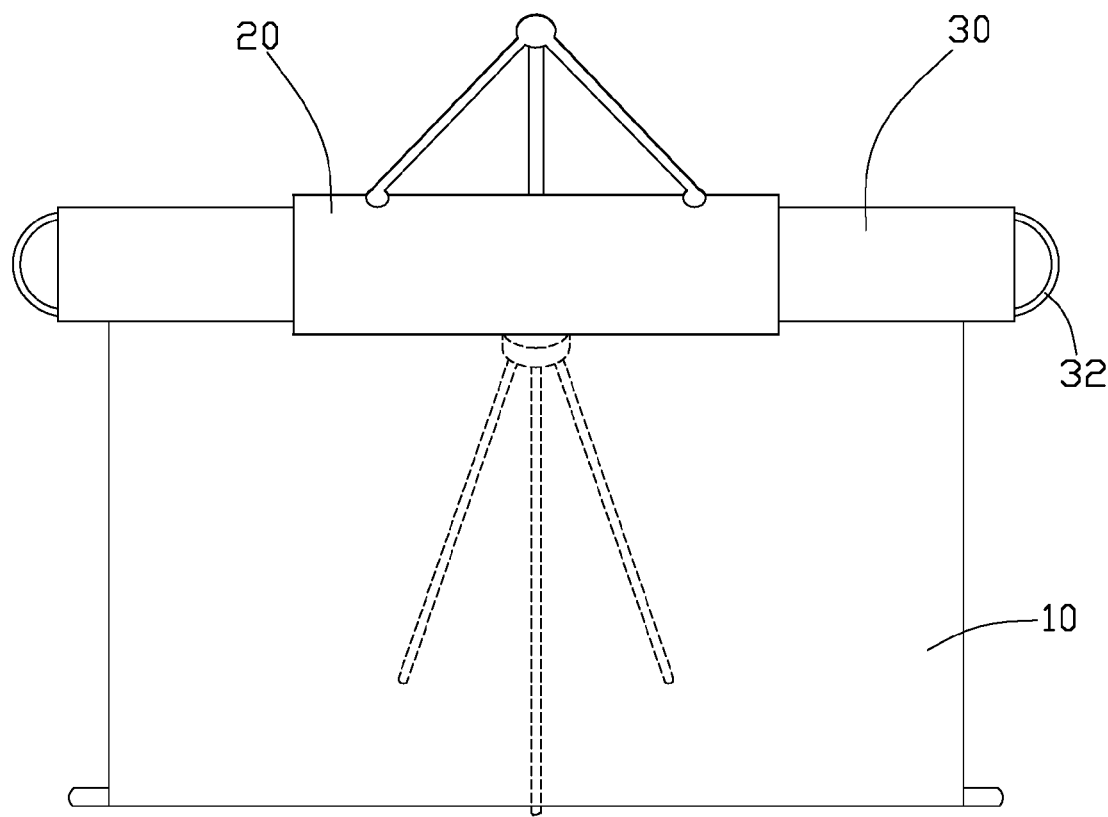
FIG. 6 is similar to FIG. 4, but the portable projector screen assembly is supported by a supporting mechanism, and the screen is unfurled.

Referring further to FIG. 6, the first cylinder 20 is supported by a bracket or other supporting mechanism. The screen 10 is pulled out from the slot 21 of first cylinder, then the second cylinders 30 are pulled out from the opposite ends of the first cylinder 20. The third cylinders 50 and the elastic members 54 are moved away from the roller 40 together with the second cylinders 30 respectively. The elastic members 54 are stretched and pull the blocks 52 to slide away from the roller 40. The collapsible member 70 connected between the blocks 52 is extended, and the screen 10 is unfolded. Therefore, the transverse size of the screen 10 is extended.

To pleat the screen 10, the second cylinders 30 are pushed to be inserted into the first cylinder 20. The third cylinders 50 are inserted into the roller 40, and the elastic members 54 are compressed to push the blocks 52 to slide toward the roller 40. The collapsible member 70 is collapsed, and the screen 10 is pleated in a transverse direction. Thereafter, the screen 10 can be furled in longitudinal direction by rotating the first cylinder.

In a second embodiment, the first cylinder 20, the second cylinders 30, the elastic members 54, and the blocks 52 of the first embodiment are omitted. Two free ends of the collapsible member 70 of the first embodiment are connected to free ends of the third cylinders 50 respectively.

In a third embodiment, the roller 40, the third cylinders 50, the connecting members 60, the elastic members 54, and the blocks 52 of the first embodiment are omitted. Two free ends of the collapsible member 70 of the first embodiment are connected to free ends of the second cylinders 30 respectively.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A portable projector screen assembly comprising:
   a first cylinder;
   two second cylinders slidably connected to two ends of the first cylinder respectively;
   a roller;
   two third cylinders slidably connected to two ends of the roller respectively;
   a collapsible member comprising a plurality of interconnected pieces, the collapsible member connected to the roller, and two free ends of the collapsible member fixed to free ends of the third cylinders respectively, enabling the collapsible member retractable or extendable parallel to the axis of the roller, wherein the roller and the collapsible member are received in the first cylinder, and the free ends of the third cylinders are fixed to free ends of the second cylinders respectively; and
   a screen comprising a plurality of fixing portions, the fixing portions respectively connected to joints of each two pieces of the collapsible member, the screen furled around the roller when the roller being rotated.

2. The portable projector screen assembly as claimed in claim 1, wherein each of the first cylinder and the second cylinders defines a slot therein, the slots extend in a direction parallel with axes of the first cylinder and the second cylinders, the screen is exposed out of the slots.

3. The portable projector screen assembly as claimed in claim 1, wherein each of the free ends of the second cylinders connects a cover forming a handle on an outside surface thereof, the free ends of the third cylinders fixed to inside surfaces of the covers respectively.

4. The portable projector screen assembly as claimed in claim 3, wherein two blocks connected to the free ends of the collapsible member are slidably placed around the third cylinders respectively, two elastic members are placed around the third cylinders respectively, one end of each of the elastic members is connected to a corresponding block, and the opposite end of each of the elastic members is connected to an inside surfaces of a corresponding cover.

5. The portable projector screen assembly as claimed in claim 4, wherein the elastic members are coil springs.

6. The portable projector screen assembly as claimed in claim 1, wherein each of the roller and the third cylinders defines a slot therein, the slots extend in a direction parallel with axes of the roller and the third cylinders respectively, each of the pieces of the collapsible member is coupled with a connecting member, the connecting members are inserted into the slots of the roller and the third cylinders, and each of the connecting members comprises a ball slidably received in the corresponding roller or a corresponding third cylinder.

7. A portable projector screen assembly comprising:
   a first cylinder;
   two second cylinders slidably connected to two ends of the first cylinder respectively;
   a collapsible member comprising a plurality of interconnected pieces, the collapsible member received in the first cylinder and the second cylinders, and two free ends of the collapsible member fixed to free ends of the second cylinders respectively; and
   a screen comprising a plurality of fixing portions, the fixing portions respectively connected to joints of each two pieces of the collapsible member.

8. The portable projector screen assembly as claimed in claim 7, wherein each of the first cylinder and the second cylinders defines a slot therein, the slots extend in a direction parallel with axes of the first cylinder and the second cylinders respectively, and the screen is exposed out of the slots.

9. The portable projector screen assembly as claimed in claim 7, wherein the first cylinder forms two inner flanges on inner surfaces of opposite ends thereof, and each of the second cylinders forms an outer flange on an outer surface of one end thereof, for engaging with a corresponding inner flange of the first cylinder.

* * * * *